United States Patent [19]

Suhara et al.

[11] 4,389,494
[45] Jun. 21, 1983

[54] PROCESS FOR PRODUCING A MEMBRANE FOR ELECTROLYSIS BY FORMING REMOVABLE THIN LAYER UPON ELECTRODE

[75] Inventors: Manabu Suhara; Tomoki Gunjima; Haruhisa Miyake, all of Yokohama, Japan

[73] Assignee: Asahi Glass Company Ltd., Tokyo, Japan

[21] Appl. No.: 283,546

[22] Filed: Jul. 15, 1981

[30] Foreign Application Priority Data

Jul. 29, 1980 [JP] Japan .................................. 55-103096

[51] Int. Cl.$^3$ .......................... B01J 47/12; C25C 7/02
[52] U.S. Cl. ........................................ 521/27; 521/28; 204/280
[58] Field of Search ......................................... 521/327

[56] References Cited

U.S. PATENT DOCUMENTS

| | | | |
|---|---|---|---|
| 2,510,262 | 6/1950 | Sollner et al. | 521/27 |
| 2,957,206 | 10/1960 | Mindick et al. | 521/27 |
| 3,375,208 | 3/1968 | Duddy | 521/28 |
| 3,770,666 | 11/1973 | Quentin | 521/27 |
| 4,036,728 | 7/1977 | Babinsky | 204/283 |
| 4,110,153 | 8/1978 | Rechlicz | 156/633 |
| 4,116,889 | 9/1978 | Chlanda et al. | 521/27 |
| 4,191,627 | 3/1980 | Specht | 156/226 |
| 4,272,560 | 6/1981 | Baczek et al. | 427/58 |

FOREIGN PATENT DOCUMENTS 45147 2/1982 European Pat. Off. ............ 204/296
2076857 12/1981 United Kingdom .

*Primary Examiner*—Joseph L. Schofer
*Assistant Examiner*—Peter F. Kulkosky
*Attorney, Agent, or Firm*—Oblon, Fisher, Spivak, McClelland & Maier

[57] ABSTRACT

An ion exchange membrane for an electrolysis is produced by forming a removable thin layer on a surface of a perforated electrode; forming a layer of a thermoplastic fluorinated polymer having ion exchange groups or functional groups convertible to ion exchange groups on said removable thin layer; converting said layer of a thermoplastic fluorinated polymer into a liquid impermeable membrane; and removing said removable thin layer, and if necessary, converting said functional groups into ion exchange groups.

5 Claims, No Drawings

PROCESS FOR PRODUCING A MEMBRANE FOR ELECTROLYSIS BY FORMING REMOVABLE THIN LAYER UPON ELECTRODE

BACKGROUND OF THE INVENTION

1. Field of the Invention

The present invention relates to a process for producing a membrane for an electrolysis. More particularly, it relates to a process for producing a membrane suitable for an electrolysis of water or an aqueous solution such as an aqueous solution of an acid or a base, an alkali metal halide or an alkali metal carbonate.

2. Description of the Prior Art

In an electrolysis of said aqueous solution especially, a process for producing an alkali metal hydroxide and chlorine by an electrolysis of an aqueous solution of an alkali metal chloride, a diaphragm or membrane process has been employed instead of a mercury process in view of the prevention of public pollution. In the diaphragm or membrane process, an asbestos liquid permeable diaphragm has been mainly used as a diaphragm for partitioning an anode compartment and a cathode compartment in an industrial operation. The diaphragm has been usually formed by depositing asbestos fiber on a perforated metallic cathode. On the other hand, an electrolysis using a liquid impermeable membrane made of an ion exchange material has been proposed to overcome the disadvantages of the electrolysis using the liquid permeable diaphragm. The liquid permeable membrane made of an ion exchange material i.e. an ion exchange membrane is usually supplied in a form of a film. Therefore, it could not be used for the purpose of direct deposition on the perforated metallic cathode. The following process has been proposed as a process for directly forming a liquid impermeable ion exchange membrane on the conventional perforated metallic cathode as disclosed in Japanese Unexamined Patent Publication No. 142,678/1977: An asbestos layer is formed on a surface of a perforated electrode and then, a thermoplastic ion exchange material layer is deposited and is melt-bonded on the surface of the asbestos layer by a heat treatment to convert it into a water impermeable membrane whereby a membrane of a melt-bonded asbestos ion exchange material layer is formed on the perforated cathode. Thus, the conventional diaphragm electrolytic cell is converted into an ion exchange membrane type electrolytic cell. According to said process, it has been difficult to overcome the disadvantages of trouble caused by the incorporation of an asbestos layer in the membrane and the requirement of a high temperature such as 240° to 300° C. in the melt-bonding step.

SUMMARY OF THE INVENTION

It is an object of the present invention to overcome the above-mentioned troubles and disadvantages.

The foregoing and other objects of the present invention have been attained by providing a process for producing an ion exchange membrane for an electrolysis which comprises forming a removable thin layer on a surface of a perforated electrode; forming a layer of thermoplastic fluorinated polymer having ion exchange groups or functional groups convertible to ion exchange groups on said removable thin layer; converting said layer of a thermoplastic fluorinated polymer into a liquid impermeable membrane; and removing said removable thin layer, and if necessary, converting said functional groups into ion exchange groups.

DETAILED DESCRIPTION OF THE PREFERRED EMBODIMENTS

As a result of studies for overcoming troubles and disadvantages of said conventional process, it has been found that a liquid impermeable ion exchange membrane which can be used for an electrolysis without any trouble can be obtained even though the resulting asbestos fiber layer is removed and trouble is not caused because of a direct contact of a cathode with the ion exchange polymer layer, and the electric resistance can be reduced. Moreover, when a thin layer of a polymer is used for the asbestos fiber layer, the layer is easily removed.

The perforated electrode used in the present invention can be conventional perforated electrodes having a hole area ratio of at least 30% in a form of an expanded metal, a louver, rods or a wire net. The perforated electrode having a desired configuration made of a desired material can be used and can have a desired pore area ratio. A plurality of perforated plates can be plied. When a plurality of perforated plates having different pore area ratios is used, the perforated plate having a smaller pore area ratio is placed in the side of the membrane. The cathode is treated to reduce hydrogen overvoltage and is formed to be a finger type electrode and installed in a diaphragm type electrolytic cell. It is especially advantageous to use such electrolytic cell as an electrolytic cell equipped with a liquid impermeable ion exchange membrane layer. It is important to have a configuration suitable for maintaining a desired current distribution and discharging the generated gas, and also suitable for forming a thin layer for depositing the ion exchange material at a desired thickness.

An anode can be made of a platinum group metal, a conductive oxide thereof, or a conductive reduction oxide thereof. On the other hand, a cathode can be made of a platinum group metal, a conductive oxide or an iron group metal.

The platinum group metals include platinum, rhodium, ruthenium, palladium and iridium. The iron group metals include iron, cobalt, nickel, Raney nickel, stabilized Raney nickel, stainless steel, alkali etching stainless steel (Japanese Examined Patent Publication No. 19229/1979). Raney nickel plated cathode (Japanese Unexamined Patent Publication No. 112785/1979) rhodan nickel plated cathode (Japanese Unexamined Patent Publication No. 115676/1978).

The perforated electrode can be prepared by the material for the anode or the cathode. Thus, when a platinum group or a conductive oxide thereof is used, it is preferable to prepare the perforated electrode by coating such material on a surface of an expanded metal made of a valve metal such as titanium and tantalum. When an acid resistance is not required as a production of hydrogen in the electrolysis of water, it is not always necessary to use a precious metal as the anode material. It is possible to use a desired material except high oxygen overvoltage, for example, platinum group metals such as platinum, iridium, palladium and ruthenium, alloys thereof; conductive oxides of said metal or alloy; graphite, nickel and nickel containing oxide. On the other hand, a material which does not have high acid resistance such as iron, stainless steel, nickel, Raney nickel and stabilized Raney nickel can be also effectively used as the cathode material. Thus, it is also possible to use platinum group metals such as platinum, ruthenium and rhodium, alloys thereof, conductive oxides thereof and carbon or graphite on which such material is supported as the cathode material.

The thin layer formed on the perforated electrode is used as a removable support for an ion exchange material which is formed on the electrode and is removable from the side of the electrode. In view of easy removability by dissolution or decomposition, a polymer or an inorganic salt which easily forms a thin layer such as calcium carbonate. It is possible to form a layer of an inorganic fiber such as asbestos and glass fiber. It is also possible to form a metallic foil layer such as aluminum foil and copper foil.

The polymers can be materials whch can be easily removed from a surface of an electrode by a dissolution, a decomposition or a shrinking by contacting water, a solution of an alkali metal hydroxide or an organic solvent if necessary at an elevated temperature upto about 120° C., for example, polyvinyl alcohols, polyacrylic acid, cellulose derivatives, polyvinyl pyrrolidone, vinyl acetate and vinylidene chloride. A solution or a suspension of the polymer is coated on the perforated electrode by dipping or coating or plying a film or cloth if necessary after forming it into a desired shape or by depositing fiber or fine flakes from a slurry as a thin layer having a thickness of 5 to 200μ preferably 10 to 500μ. In order to give uniform thickness and smoothness of the ion exchange layer formed on the thin layer, it is preferable to have less surface porosity and smoothness for the thin layer.

When an inorganic fiber is used, the inorganic fiber in a form of slurry is deposited on the perforated electrode if necessary, by a vacuum suction to form the thin layer. When the inorganic fiber is used, a rough surface of the thin layer is easily formed. Thus, it is preferable to incorporate a water soluble polymer such as polyvinyl alcohol, polyacrylic acid, polyacrylamide and vinyl pyrrolidone in the slurry or to coat the solution of the water soluble polymer after forming the thin layer, on the surface of the thin layer whereby the porosity of the thin layer is reduced to form a smooth surface in order to form an ion exchange membrane.

The inorganic fiber having a diameter of 0.01 to 20μ and a length of 0.5 to 20 mm is usually used to form a layer having a thickness of 10 to 2000μ preferably 40 to 500μ. It is preferable to give a density for liquid permeability of upto 5 cc especially upto 0.5 cc per 1 cm² minute under a pressure of 100 cm H₂O in 20% an aqueous solution of sodium chloride at 25° C.

The metallic materials are materials which can be dissolved in an aqueous solution of an acid or a base, for example, aluminum and copper. The metallic material in a form of foil is coated on the perforated electrode by a physical process such as bonding, or the metallic material in a form of fiber or fine flake is deposited from the slurry on the perforated electrode to form a thin layer having a thickness of 5 to 2000μ preferably 10 to 500μ.

A layer of a thermoplastic polymer having ion exchange groups or functional groups convertible to ion exchange groups is formed on the thin layer. The thermoplastic polymer can be fluorinated polymers for ion exchange membranes having sulfonic acid groups, carboxylic acid groups, phosphoric acid groups or the other ion exchange functional groups which have chlorine and/or oxygen resistance. A solution, an aqueous dispersion, or an organic solvent dispersion of the fluorinated polymer is uniformly coated on the thin layer by a coating, a dipping or a deposition under vacuum suction and is dried under a desired condition and if necessary, heat-treated for melt-bonding particles of the polymer to form a liquid impermeable membrane.

It is especially preferable to use an organic solvent dispersion obtained by the prior invention (Japanese Patent Application Nos. 149,479/1979 and 157,989/1979) which is a dispersion prepared by concentrating an aqueous dispersion of the fluorinate polymer obtained by an emulsion polymerization by a centrifugal separation etc. and adding a water miscible organic medium such as alcohol and further concentrating by a centrifugal separation and repeating the steps to replace the aqueous medium to the hyrophilic organic medium because it has excellent film formability to form a liquid impermeable membrane by a heat-treatment at a relatively low temperature such as about 40° to 160° C.

The typical fluorinated polymer is a copolymer having 5 to 40 mol % of functional fluorovinyl compound units which is obtained by polymerizing a fluorovinyl compound having the formula

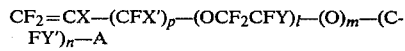

wherein p is 0-1; l is 0-3; m is 0-1; n is 0-12; X represents fluorine or chlorine atom or —CF₃; X' represents fluorine atom or —CF₃; Y represents fluorine atom or —CF₃; Y' represents fluorine atom or a C₁-C₁₀ perfluoroalkyl group; A represents —CN, —COOR₁, —COOM, —CONR₂R₃, —SO₂F, —SO₃M, —SO₃H, —PO(OH)₂, —PO(OR₁)₂, —PO(OM)₂; R₁ represents a C₁-C₁₀ alkyl group, R₂ and R₃ respectively hydrogen atom or R₁; M represents an alkali metal or quaternary ammonium group with a fluoroolefin having the formula

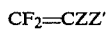

wherein Z and Z' respectively represent fluorine, chlorine, hydrogen atom or —CF₃, if necessary with a third monomer in the presence of a polymerization initiator in an aqueous medium in the presence of an emulsifier. The water miscible organic solvents used for replacement can be alcohols, ketones, organic acids, aldehydes, amines, esters and ethers, preferably methanol, N-methyl pyrrolidone and diethyleneglycol monomethyl ester. The concentrating process can be a centrifugal separation, an electric decantation, a freezing process and an evaporating process.

An amount of an ion exchange polymer on a thin layer is selected to give an ion exchange membrane having a thickness of 30 to 1000μ preferably 50 to 400μ. When the thickness is to thick, the cost for the membrane is increased and the electric resistance is increased, whereas when it is too thin, a desired strength can not be given.

The perforated electrode on which the thin layer and the ion exchange layer are formed is treated to remove the thin layer. Usually, the thin layer is removed by dissolving in an alkali hydroxide, an acid or an organic solvent if necessary, at an elevated temperature of upto about 160° C. The thin layer can be removed by dissolving with decomposition or by peeling off with shrinkage depending upon the kind of the thin layer material. When there is not trouble for the quality of the object product obtained by the electrolysis, only a desired amount of the thin layer can be removed to complete the removement during the electrolysis operation. When an alkali metal hydroxide is used, it is usual to result in the conversion to form ion exchange groups by hydrolysis together with the removement of the thin layer. In the other case, the conversion to the ion exchange groups is performed after the removement of the thin layer.

It is important in the present invention, that the ion exchange membrane is substantially liquid-impermeable even though the severe condition for removing the thin layer is given, and it has a liquid permeability of only upto 0.3 cc/cm$^2$.min. preferably upto 0.03 cc/cm$^2$.min. in 20% aqueous solution of sodium chloride at 25° C.

An ion exchange capacity of the ion exchange membrane is usually in 0.5 to 2.5 meq./g.dry polymer especially 0.8 to 2.0 meq./g.dry polymer. The ion exchange membrane is not limited to make it by one kind of the polymer or one kind of ion exchange groups. For example, the ion exchange capacity in the cathode side can be smaller or the weak acidic ion exchange groups such as carboxylic acid groups can be given in the cathode side and the strong acidic ion exchange groups such as sulfonic acid groups can be given in the anode side.

When the ion exchange layer is formed on the perforated cathode, the conventional diaphragm type electrolytic cell which has been used in industrial operation can be used for an ion exchange membrane type electrolytic cell and the disadvantages for the conventional diaphragm process can be eliminated. It is possible to apply the present invention on the anode.

In the present invention, the electrolytic cell can be either a monopolar or dipolar type electrolytic cell using said ion exchange film. The substrate of the electrolytic cell in the electrolysis of an aqueous solution of an alkali metal chloride can be any substrate durable to an aqueous solution of an alkali metal chloride and chlorine such as valve metals, and titanium in the anode compartment and any substrate durable to alkali metal hydroxide and hydrogen, such as iron, stainless steel or nickel in the cathode compartment.

The conditions of the process for electrolysis of an aqueous solution of an alkali metal chloride using the ion exchange membrane of the present invention can be the known conditions disclosed in Japanese Unexamined Patent Publication No. 112398/1979 etc. For example, an aqueous solution of an alkali metal chloride having a concentration of 2.5–5.0 N is fed into the anode compartment and water or a diluted alkali metal hydroxide is fed into the cathode compartment and an electrolysis is preferably performed at 80° to 120° C. at a current density of 10 to 100 A/dm$^2$. In such a case, heavy metal ions such as calcium and magnesium in an aqueous solution of an alkali metal chloride cause deterioration of the ion exchange membrane. Therefore, it is preferably minimized. It is possible to add an acid such as hydrochloric acid to an aqueous solution of an alkali metal chloride in order to reduce the generation of oxygen on the anode.

When an electrolysis of water is carried out by using the ion exchange membrane in the present invention, an aqueous solution of an alkali metal hydroxide such as potassium hydroxide, sodium hydroxide or lithium hydroxide is fed into the anode compartment equipped with an anode and water is fed into the cathode compartment equipped with the cathode and the resulting ion exchange membrane. In the electrolysis, hydrogen gas and an aqueous solution of an alkali metal hydroxide are formed in the cathode compartment. A part or whole of the aqueous solution of an alkali metal hydroxide is recycled into the anode compartment. Oxygen gas is formed in the anode compartment.

A concentration of an aqueous solution of an alkali metal hydroxide fed into the anode compartment is preferably in a range of 5 to 45 wt.%. When a concentration is less than the lower limit, effective reduction of a cell voltage can not be expected whereas, when it is more than the upper limit, a further effect for reduction of a cell voltage can not be expected, and life of the cation exchange membrane is shortened or a substrate of the electrolytic cell is disadvantageously corroded.

In the electrolysis, a temperature is preferably in a range of 80° to 150° C. especially 85° to 120° C. and a current density is preferably in a range of 10 to 150 A/dm$^2$, especially 20 to 100 A/dm$^2$.

An electrode reaction of an electrolysis of water with an aqueous solution of an alkali metal hydroxide to obtain hydrogen and oxygen gases in the present invention is as follows.

Cathode: $H_2O + e \rightarrow OH^- + \frac{1}{2}H_2$
Anode: $OH^- \rightarrow \frac{1}{2}H_2O + \frac{1}{4}O_2 + e$ A theoretical cell voltage in the reaction is about 1.23 V. This can reduce the cell voltage by about 0.4 to 0.5 V in comparison with the conventional electrolysis under the condition departing the cation exchange membrane from the electrode.

The examples of the electrolysis of an aqueous solution of an alkali metal chloride or an alkali metal hydroxide using the ion exchange membrane of the present invention have been illustrated. It is possible to apply the present invention for an electrolysis of a halogen acid such as hydrogen chloride and hydrogen bromide or an alkali metal carbonate.

The present invention will be further illustrated by certain examples and references which are provided for purposes of illustration only.

EXAMPLE 1

A slurry of rayon fiber having a length of 2 to 15 mm and a diameter of 0.1 to 10$\mu$ at a content of 6 wt.% was used to deposit the fiber on an electrode of an iron wire net having an effective electrolytic area of 10 dm$^2$, and the fiber was dried. The average thickness of the rayon fiber thin layer was 150$\mu$.

On the other hand, an aqueous dispersion of a copolymer of 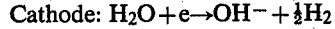 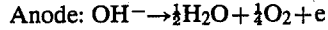 $CF_2=CF_2$ and $CF_2=CF-O-(CF_2)_3-COOCH_3$ was converted into an organic medium dispersion of the copolymer having the following formulation by repeatedly replacing water to the organic solvent.

| Copolymer: | 25% |
| --- | --- |
| N—methyl pyrrolidone: | 43% |
| Methanol: | 17% |
| Water: | 15% |

The organic medium dispersion applied to coat the copolymer on the rayon fiber thin layer and the layers were dried at 55° C. for 20 hours.

The electrode having the layers was dipped in 25% NaOH aqueous solution at 90° C. for 3 days to dissolve the rayon fiber thin layer and to hydrolyze the ester groups of the copolymer. The average thickness of the resulting ion exchange membrane on the electrode was 250μ and the ion exchange capacity was 1.43 meq./g.dry polymer. Rayon fiber did not remain.

The treated electrode was used as a cathode and an expanded metal made of titanium on which ruthenium oxide was coated was used as an anode and both electrodes were kept within a space of 5 mm. An electrolysis were carried out by feeding 5 N-NaCl aqueous solution into an anode compartment and feeding water into a cathode compartment while maintaining pressure in the anode compartment higher than the pressure in the cathode compartment by 5 cm $H_2O$ at a current density of 20 A/$dm^2$ at 90° C. for 3 months. As a result, 37% NaOH aqueous solution was obtained and a cell voltage was 3.50 V, and a current efficiency was 94.7% and a content of NaCl in NaOH aqueous solution was 100 ppm. The characteristics were substantially stable.

EXAMPLE 2

A polyvinyl alcohol film having a thickness of 50μ was bonded on the iron wire net electrode of Example 1 with an adhesive. The organic medium dispersion of Example 1 was coated on the film and dried at 100° C. for 10 hours to form an ion exchange membrane having a thickness of 200μ. The electrode having the layers was dipped in 25% NaOH aqueous solution at 90° C. for 2 days, whereby polyvinyl alcohol film was completely removed.

The treated electrode was used to prepare an electrolytic cell of Example 1. An electrolysis was carried out by the process of Example 1 by feeding 5 N-NaCl aqueous solution at a current density of 30 A/$dm^2$ for 3 months to obtain 35% NaOH aqueous solution having a content of NaCl of 12 ppm. A cell voltage was 3.63 V and a current efficiency was 94.2%.

EXAMPLE 3

A slurry of 3% of asbestos fiber having a length of 2 to 20 mm and a diameter of 0.5 to 5μ was used to deposit the fiber on the iron wire net electrode of Example 1 and the fiber was dried. An average thickness of the asbestos fiber thin layer was 200μ. The organic medium dispersion of Example 1 was applied to coat the copolymer on the fiber layer and dried at 120° C. for 5 hours to obtain an ion exchange membrane having an average thickness of 200μ. The electrode having the layers was dipped in 25% NaOH aqueous solution at 90° C. for 16 hours to hydrolyze the ester groups of the copolymer and to remove a part of the asbestos fiber.

The treated electrode was used to prepare an electrolytic cell of Example 1. An electrolysis was carried out by feeding 5 N-NaCl aqueous solution into the anode compartment and feeding water into the cathode compartment while maintaining a concentration of NaOH in the catholyte to 40% for 14 days. According to the inspection of the cathode, the asbestos fiber was substantially dissolved and did not remain.

An electrolysis was carried out by maintaining a concentration of NaCl in the anolyte to 3.5 N at a current density of 20 A/$dm^2$ at 90° C. for 6 months to obtain 37% NaOH aqueous solution having a content of NaCl of 60±10 ppm. A cell voltage was 3.46 V and a current efficient was 94.6%.

A liquid permeation velocity of the ion exchange membrane after the electrolysis for 6 months was upto 0.01 cc/$cm^2$.min. under a pressure difference of 1 m$H_2O$ at room temperature in 5 N-NaCl aqueous solution.

EXAMPLE 4

A slurry of glass fiber having a length of 1 to 15 mm and a diameter of 0.2 to 5μ was used to deposit the glass fiber on the iron wire net electrode of Example 1 and the fiber was dried and 2% solution of polyvinyl alcohol was sprayed on the layer and dried. The average thickness of the glass fiber layer was 300μ. An organic medium dispersion obtained by diluting the organic medium dispersion of Example 1 to 10% of the concentration of the copolymer was coated three times with each air drying on the layer of the electrode and the product was dried at 55° C. for 50 hours.

The electrode having the layers was dipped in 25% NaOH aqueous solution at 90° C. for 16 hours and also dipped in 30% NaOH aqueous solution for 5 days to hydrolyze the ester groups of the copolymer and to remove the glass fiber and polyvinyl alcohol to obtain an ion exchange membrane having a thickness of 300μ.

The treated electrode was used to prepare an electrolytic cell of Example 1 and an electrolysis was carried out by feeding 5 N-NaCl aqueous solution into the anode compartment for 3 months to obtain 35% NaOH aqueous solution having a content of NaCl of 25 ppm. A cell voltage was 3.45 V and a current efficiency was 94.5%.

Prior to the electrolysis, 5 N.NaCl aqueous solution was placed in the anode side and 25% NaOH aqueous solution was placed in the cathode side to stand still for 2 hours. Then, the pressure in the anode side was increased for 1 m$H_2O$ and the change of the concentration of NaCl in the aqueous solution of NaOH after applying the pressure was measured and a permeation velocity of NaCl aqueous solution was calculated. It was upto $2 \times 10^{-8}$ eq./$cm^2$.hour. It was confirmed to be substantially liquid impermeable.

EXAMPLE 5

An aqueous solution of 0.2% of sodium polyacrylate containing 5% of aluminum foil having a thickness of 3 to 10μ and a size of 7–8 mm square was used to deposit by suction on the iron wire net electrode of Example 1 and it was dried. The average thickness of the aluminum layer with sodium polyacrylate as a binder was 50μ. The organic medium dispersion of Example 1 was coated on the layer and dried at 120° C. for 5 hours to obtain an ion exchange membrane having an average thickness of 250μ. The electrode having the layers was installed in an electrolytic cell and 25% NaOH aqueous solution was charge in the cathode compartment and 5 N-NaCl aqueous solution was charged in the anode compartment at 80° C. for 64 hours at stand still to remove the aluminum foil and the binder and to hydrolyze the copolymer. An electrolysis was carried out by feeding 5 N-NaCl aqueous solution in the anode compartment and feeding water in the cathode compartment while maintaining the concentration of NaOH in the catholyte to 40% for 30 days at a current density of 20 A/$dm^2$ at 90° C. and as concentration of an anolyte of 3.2 N. A current efficiency for producing 40% NaOH was 95.1% and a cell voltage was 3.65 V and a content of NaCl in the NaOH aqueous solution was 8 ppm.

EXAMPLE 6

A slurry of 6% of rayon fiber having a length of 2 to 15 mm and a diameter of 0.1 to 10μ was used to deposit the rayon fiber on a nickel wire net treated by Raney nickel plating (10 mesh) having an effective electrolytic area of 10 dm$^2$ and the fiber was dried. An average thickness of the rayon fiber thin layer on the electrode was 150μ.

The organic medium dispersion of Example 1 was applied to coat the copolymer on the rayon fiber thin layer and the layer was dried at 55° C. for 20 hours. The electrode having the layers was dipped in 20% KOH aqueous solution at 90° C. for 3 days to dissolve the rayon fiber thin layer and to hydrolyze the ester groups of the copolymer. An average thickness of the resulting ion exchange membrane on the electrode was 100μ and an ion exchange capacity was 1.88 meq./g.dry polymer. Rayon fiber did not remain.

The electrode having the ion exchange membrane was used as a cathode and an expanded metal made of nickel on which platinum and iridium were coated was used as an anode and both electrodes were kept within a space of 2 mm. An electrolysis was carried out by feeding 20% KOH aqueous solution into an anode compartment and feeding water into a cathode compartment while maintaining the pressure in the anode compartment higher than the pressure in the cathode compartment by 5 cmH$_2$O at a current density of 20 A/dm$^2$ at 90° C. A cell voltage was 1.69 V.

EXAMPLE 7

A polyvinyl alcohol film having a thickness of 50μ was bonded on the Raney nickel plated nickel wire net electrode of Example 6 with an adhesive. The organic medium dispersion of Example 1 is applied to coat the copolymer on the film and dried at 100° C. for 10 hours to form an ion exchange layer having a thickness of 200μ and an ion exchange capacity of 1.88 meq./g. dry polymer.

The electrode having the layers was dipped in 20% KOH aqueous solution at 90° C. for 2 days whereby the polyvinyl film was completely removed.

The treated electrode was used to prepare an electrolytic cell of Example 6. An electrolysis was carried out by the process of Example 6 by feeding 20% KOH aqueous solution at a current density of 30 A/dm$^2$. As a result, a cell voltage was 1.78 V.

EXAMPLE 8

A slurry of 3% of asbestos fiber having a length of 2 to 20 mm and a diameter of 0.5 to 5μ was used to deposit the fiber on the Raney nickel plated electrode of Example 6 and the fiber was dried. An average thickness of the asbestos fiber thin layer was 200μ. The organic medium dispersion of Example 1 was coated in the fiber layer and dried at 120° C. for 5 hours to obtain an ion exchange membrane having an average thickness of 150μ. The electrode having the layers was dipped in 25% NaOH aqueous solution at 90° C. for 16 hours to hydrolyze the ester groups of the copolymer and to remove a part of the asbestos fiber.

The treated electrode was used to prepare an electrolytic cell of Example 6. An electrolysis was carried out by feeding 25% NaOH aqueous solution into the anode compartment and feeding water into the cathode compartment while maintaining a concentration of NaOH in the catholyte to 25% for 14 days. According to the inspection of the cathode, the asbestos fiber was substantially dissolved and did not remain.

An electrolysis was carried out by maintaining a concentration of NaOH in the catholyte to 25% at a current density of 20 A/cm$^2$ at 90° C. A cell voltage was 1.82 V. A liquid permeation velocity of the ion exchange membrane after the electrolysis was upto 0.01 cc/cm$^2$. min under a pressure difference of 1 mH$_2$O at room temperature in 10% NaOH aqueous solution.

EXAMPLE 9

A slurry of glass fiber having a length of 1 to 15 mm and a diameter of 0.2 to 5μ was used to deposit the glass fiber on the Raney nickel plated electrode of Example 6 and the fiber was dried and 2% solution of polyvinyl alcohol was sprayed on the layer and dried. An average thickness of the glass fiber layer was 300μ. An organic medium dispersion obtained by diluting the organic medium dispersion of Example 1 to 10% of the concentration of the copolymer was applied to coat the copolymer three times with each air drying on the fiber layer of the electrode and the product was dried at 55° C. for 50 hours.

The electrode having the layers was dipped in 25% NaOH aqueous solution at 90° C. for 16 hours and also dipped in 30% NaOH aqueous solution for 5 days to hydrolyze the ester groups of the copolymer and to remove the glass fiber and polyvinyl alcohol to obtain an ion exchange membrane having a thickness of 125μ.

The treated electrode was used to prepare an electrolytic cell of Example 6 and an electrolysis was carried out by feeding 25% KOH aqueous solution into the anode compartment. A cell voltage was 1.73 V.

EXAMPLE 10

An aqueous solution of 0.2% sodium polyacrylate containing 5% of aluminum foil having a thickness of 3 to 10μ and a size of 7–8 mm square was used to deposit by suction on the nickel wire net of Example 6 which was platinum black plated and it was dried. An average thickness of the aluminum layer with sodium polyacrylate as a binder was 50μ. The organic medium dispersion of Example 6 was coated on the layer and dried at 120° C. for 5 hours to obtain an ion exchange layer having an average thickness of 125μ. The electrode having the layers was installed in an electrolytic cell and 25% KOH was charged in the cathode compartment and 25% KOH aqueous solution was charged in the anode compartment at 80° C. for 64 hours at stand still to remove the aluminum foil and binder and to hydrolyze the copolymer. An electrolysis was carried out by feeding 25% KOH aqueous solution in the anode compartment and feeding water in the cathode compartment while maintaining the concentration of KOH in the catholyte to 25% for 30 days at a current density of 20 A/dm$^2$ at 90° C. A cell voltage was 1.72 V.

We claim:

1. A process for producing an ion exchange membrane for electrolysis which comprises forming a removable thin layer of polyacrylate, polyvinylalcohol optionally mixed with inorganic fiber on a surface of a perforated electrode; forming a layer of a thermoplastic fluorinated polymer having ion exchange groups or functional groups convertible to ion exchange groups on said removable thin layer; converting said layer of a thermoplastic fluorinated polymer into a liquid impermeable membrane; and removing said removable thin layer by treating with an aqueous solution of an alkali metal hydroxide, and if necessary, converting said functional groups into ion exchange groups.

2. The process according to claim 1 wherein said removable thin layer contains a a metal and said thin layer of said metal is removed by treating with an aqueous solution of an acid or a base.

3. The process according to claim 1 wherein said thermoplastic fluorinated polymer having ion exchange groups or functional groups convertible to ion exchange groups is used in a form of an aqueous dispersion of said fluorinated polymer which is converted into an organic medium dispersion by replacing said aqueous solution to a hydrophilic organic medium.

4. The process according to claim 1 or 3 wherein said fluorinated polymer layer is converted into a liquid impermeable membrane by heating it at 40° to 160° C. thin layer.

5. The process according to claim 3 wherein a liquid permeability of said liquid impermeable membrane is upto 0.3 cc/cm$^2$. minute under a pressure difference of 100 cmH$_2$O.

* * * * *